April 22, 1952

P. ROBINSON ET AL 2,593,922

INSULATED ELECTRICAL CONDUCTOR

Filed April 16, 1947

PRESTON ROBINSON
COLIN C. REID
INVENTORS

BY Arthur G. Connolly
ATTORNEY

Patented Apr. 22, 1952

2,593,922

UNITED STATES PATENT OFFICE 2,593,922

INSULATED ELECTRICAL CONDUCTOR

Preston Robinson, Williamstown, and Colin C. Reid, Boston, Mass., assignors to Sprague Electric Company, North Adams, Mass., a corporation of Massachusetts Application April 16, 1947, Serial No. 741,887

2 Claims. (Cl. 204—38)

This invention relates to the bonding of metal surfaces to non-metal surfaces and more particularly refers to novel means of bonding electrical conductors to non-conductors.

It is well known that cables, wires and other electrical conductors may be coated with resinous materials such as rubber, Bakelite, polyvinyl chloride, etc. This is subject to the great difficulty that resinous materials do not adhere satisfactorily to the surface of the metal conductor. To overcome this difficulty it has been proposed to roughen the metal surfaces to lower the contact angle between the metal and the resinous insulating material. This expedient has been unsuccessful, particularly where considerable flexing and bending of the conductor occurs.

Another method suggested to overcome this difficulty has been to shrink the resinous material on the metal surface by polymerization, etc. It was thought that the compressive forces of the resin on the conductor surfaces would prevent separation of the resin therefrom during temperature or flexing cycles. This, too, was unsuccessful since a true bond between the resin and metal could not be formed, and the duration of intimate contact between the resin and metal was limited, at best. The inability of the insulation material to wet the metal conductor surface also contributed to the unsuccessful bonds of the prior art.

It is an object of this invention to overcome the foregoing disadvantages and others directly or indirectly related thereto. It is a further object to produce improved bonds between metallic and non-metallic surfaces. A further object is to produce insulated electrical conductors, whose insulation is permanently bonded to the conductor by chemical means. A still further object is to produce improved electrical condensers. A further object is to produce an electrical condenser possessing high stability in high frequency electrical fields. A still further object is to produce a conductor insulated by and chemically bonded to a refractory ceramic material and a resinous material. A still further object is to produce permanent hermetic seals and bonds between conductors and non-conductors. Additional objects will become apparent from the following description and claims.

These objects are attained in accordance with the present invention wherein an electrical conductor is insulated by a non-conducting material, said conductor and said insulating material being chemically bonded to an interlayer therebetween. In a more restricted sense, this invention is concerned with an insulated electrical conductor comprising a conductor, an interlayer chemically bonded to the surface thereof and a resinous insulating material bonded to said interlayer. In a still more restricted sense, this invention is concerned with an insulated electrical conductor comprising a conductor, an interlayer chemically bonded to the surface thereof and a polymerizable and/or polymerized organic compound chemically bonded to said interlayer. The invention is particularly concerned with wires and similar objects provided with an interlayer chemically bonded to the surface thereof and a refractory ceramic material deposited on said interlayer; the particles of said ceramic material being firmly bonded to each other and to said interlayer by polymerization of a polymerizable compound. The invention is also concerned with an electrical conductor comprising helically wound electrodes separated by a porous dielectric spacer, said electrodes being chemically bonded on the surface thereof to an interlayer, and the pores of said dielectric spacer being substantially completely impregnated with a polymerizable organic compound, which is subsequently polymerized in situ and is thereby firmly chemically bonded to said interlayer. The invention is also concerned with processes for producing on conducting surfaces interlayers which are chemically bound to said surfaces and to resinous insulating materials placed thereon. The invention is further concerned with processes suited to attaching resins to metals by permanent bonds which provide a hermetic durable seal therebetween.

The metal to non-metal bonds described herein may be achieved by use of a bonding chemical interlayer situated therebetween. We have found that to obtain a permanent bonding, the interlayer must be integrally attached both to the metal surface and the non-metallic surface. The bond between the metallic surface and the interlayer is generally electrovalent, and the interlayer itself should advisably contain as one of its constituents a metallic element corresponding to a metallic element present in the surface of the metal, or a metallic element capable of uniting with said metal surface. The bond between the interlayer and the metal surface may thus be achieved by electrovalently bonding one or more anions to one or more of the metallic elements of the metal surface. The strong electrovalent forces between the anion and the metallic element or cation thus serve as a permanent bond between the metal surface and the interlayer.

The bond between the interlayer and the non-conducting material is of a different type. While the exact nature of this bond is not fully known to us it appears that it may be a form of a resonant hybrid bond, e. g. a bond which resonates between at least one element in the interlayer and at least one element in the non-conducting material.

For example, the bonding between a phenolic condensation resin and an interlayer containing a cyanide linkage may be explained by the following example of hydrogen bonding, a form of a resonant hybrid bond:

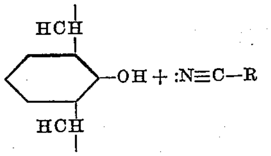

resonating with

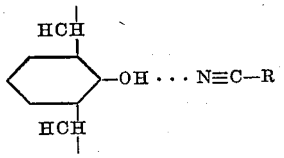

The hydrogen atom, being a bare proton during the ionic phases of the oxygen-hydrogen bond, may during that time simultaneously attract the strongly electronegative nitrogen atom.

The following general formula may explain the type of bonding between an interlayer containing a cyanide linkage and a non-conducting material containing a vinyl compound.:

$$R'—CH=CH_2+:N\equiv C—R$$

resonating with $$R'—CH\leftarrow CH_2\leftarrow N\equiv C—R$$

in which R′ may be an inorganic element or radical or an organic radical; R may be an organic radical and the arrow (←) represents a coordinate covalent link.

The types of metal surfaces which may be provided with permanently attached non-metallic coatings are extremely varied. In general, metals, metal alloys, and metal coated materials commonly used as conductors, structural members, etc. may be treated successfully in accordance with the invention. Among these are beryllium, zinc, cadmium, aluminum, tin, cerium, lead, vanadium, antimony, tantalum, bismuth, chromium, selenium, molybdenum, tellurium, tungsten, manganese, iron and the various steels, cobalt, nickel, platinum, iridium, copper, gold, silver, cesium, etc. Very satisfactory results have been achieved with metals or metal surfaces of aluminum, copper, tin, lead, and zinc, all of which are widely used as electrical conductors. The metal surfaces may be in various forms, such as foils for condensers, wires for transformers, motors, resistors, and the like, solders for electrical connections, coatings for electrical leads, etc. The physical shape or configuration of the metal to be provided with a chemical interlayer is in no way restricted by the processes for producing the interlayer, or the characteristics thereof. The metal may be in the form of wires, foils, bars, rods, plates, tubing, castings, moldings, powder, etc.

The chemical compositions of the interlayer may, as disclosed above, be selected to fit the particular requirements of the metal and the resin. If desired, two or more interbonded interlayers or constitueints of a single interlayer may be employed to bond metals and non-metals. In general, the chemical material used for treating the metal surface is a compound in which a cation will be replaced by a cation of the metal surface treated. A reaction occurs between this material and the metal surface, to produce an anion interlayer electrovalently bonded to the metal itself. This reaction may occur in the vapor, liquid or solid phase, and if desired, may be assisted by a catalyst.

In some cases, the reaction may be facilitated by application of an electrical current to a solution, suspension or emulsion of the reactant surrounding the metal, the latter generally being connected in the circuit as the anode, a separate cathode being provided. A choice may be made between a conducting and non-conducting interlayer. For example, a conducting interlayer would be preferable on a copper wire upon which refractory ceramic material was to be deposited subsequently by cataphoresis. On the other hand, a substantially non-conducting interlayer might be desirable on an aluminum foil which was to be employed in a condenser.

Among the numerous interlayers contemplated for use herein are the electrovalently bonded metallic salts containing a metallic positively charged ion or ions (obtained from the metal surface) and a negatively charged anion containing at least one element liinkage or group capable of resonant hybrid bonding with another element, linkage or group (provided in the non-conducting material to be bonded). A representative few of the anions which may accordingly be employed are those containing nitrogen with a trivalent function such as ferrocyanide, ferricyanide, thiocyanate, nitride, nitrile, cyanide, amido, amino cyanate, and complex organic radicals, for example, phthalocyanine, glyoxime, "oxime" etc.; those containing trivalent boron, sulfur, silicon complexes (fluo-silicates), arsenic, phosphorous, molybdenum, germanium, tin, cobalt, etc.; those containing halogens such as fluorine; and those containing hydrogen, carbon and oxygen. In general, the elements used in the bonding possess unshared electrons and have a possibility of varied orbital bonds. In other words, the elements listed above are generally in such form that it is possible for an additional bonding to occur, beyond that existing between other elements in the radical or interlayer as a whole.

Among the various anions which may be classified in accordance with the above instructions are molybdates, arsenates, fluorides, phosphates, phosphites, carbides, hydrides, iodides, sulfides, tungstates, chromates, cobalti-nitrides, tannates, etc.

As an example of the production of an interlayer on a metal surface, a copper foil may be provided with a thin integral chemical interlayer by electrolytic formation of copper ferrocyanide thereon. To accomplish this a copper foil may be placed in an electrolytic cell as the anode. The cell may be filled with a 6% (in water) solution of potassium ferrocyanide. A current density equivalent to about 0.1 amperes per $cm.^2$ may be applied for 10 seconds at a 20 volt potential. There is thus formed a thin layer of copper ferrocyanide on the foil. The foil may be washed and dried and subsequently bonded to a resinous material, as for example by polymerization of styrene thereon. Likewise, a condensation resin may be molded thereto. A permanent bond between the foil and interlayer and between the interlayer and resin will result.

Another example involves the formation of an aluminum phthalocyanine interlayer on an aluminum surface. This may readily be achieved by exposure of the cleaned aluminum surface to the vapors of phthalonitrile, preferably above 200° C. Insulating material may then be molded on, polymerized on or otherwise bonded to the interlayer. Alternately, the phthalonitrile may be applied from the solution or suspension, followed by heat treatment. Copper may be treated in a similar manner.

A further example which may be mentioned is the formation of a copper tannate on a copper wire surface, by electrolytic means. Copper wire may be connected as an anode in an electrolytic cell containing a water solution of tannic acid. A current of a density of about .1 ampere per $cm.^2$ may be employed at a potential of 40 volts for 5 seconds to produce a permanent copper tannate interlayer on the wire surface. The wire may then be provided with a ceramic insulation impregnated with a resin, the latter being bonded to the interlayer as heretofore discussed.

The interlayers of the invention are, in many cases, extremely stable to heat and are therefore well suited for use with metal surfaces and insulators requiring a resistance to heat both during their fabrication and in subsequent operations.

A copper ferrocyanide interlayer, for example, is stable up to and beyond 300° C., and copper thiocyanate beyond 1000° C. The interlayers, in addition to their usefulness as bonding means, often prevent corrosion and oxidation of metal surfaces, and may thus be used per se to good advantage as corrosion resistant coatings on metal surfaces. Iron, steel and copper surfaces may be particularly benefitted by a thin, integral copper ferrocyanide layer thereon. The normally corrosive light metals, e. g. aluminum and magnesium, may also be improved by an interlayer designed to eliminate corrosion.

Another advantage of the new interlayers disclosed herein resides in the fact that they appear to act as strain-absorbers between metals and non-metals, which further strengthens the bond between these dissimilar surfaces. In cases of severe flexure, the strain-absorbing properties of the interlayer are of particular advantage. The interlayers themselves, being both chemically and physically relatively thin, are flexible and do not tend to scale, peel or chip off the metal or non-metal surfaces.

Another group of useful interlayers comprises sulfur containing compounds, such as the mercaptides, sulfides, etc. Mercaptans and sulfur readily form metallic mercaptides and sulfides, with many of the common metals. Unsaturated mercaptans are useful for this purpose since the unsaturated portion of the molecule is useful in co-polymerization reactions with polymerizable vinyl compounds. The sulfides are useful as interlayers, particularly when used in conjunction with copper as the metal, and the hydrolysis products of aralkyl, alkyl and/or aryl chlor silanes as the insulating material. In addition to their bonding effect, the sulfide interlayers appear to modify the polymerization and the resulting product of the polymerizable silanes mentioned above.

In some cases it is desirable to utilize an interlayer possessing an unsaturated C=C linkage, to permit further adaption to polymerization procedures.

Reference is made to the appended drawing in which

Figure 1:
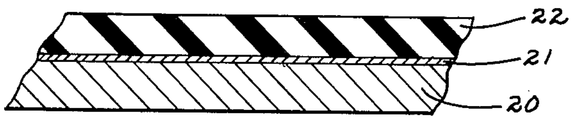
Figure 1 shows a greatly enlarged cross-section of a metal to non-metal bond, produced in accordance with this invention.

Referring more specifically to Figure 1, 20 is a metallic material, such as copper, aluminum, lead, iron, etc. It may be a pure material or an alloy such as brass, bronze and the like or a metal or other material plated or otherwise coated with a metallic layer. Integrally bonded to the surface of 20 is an interlayer 21, which may vary in thickness from one molecule to a plurality of molecules or even a thin layer readily discernible upon examination. While the interlayer 21 is shown as a continuous layer, it may also be discontinuous due to masking of portions of the metal surface with oil, to the presence of certain oxide films on the metal, etc., either deliberate or unintentional. The interlayer 21 is bonded to 20 by electrovalent bonding as previously described.

Firmly attached to interlayer 21 is non-conducting material 22, which may be any one of a wide variety of non-metallic insulating materials, such as natural and synthetic rubbers; polyvinyl resins, phenol-formaldehyde, urea-formaldehyde, melamine-formaldehyde and other so-called condensation resins; alkyd type resins; drying oils; linear polyamides such as "Nylon"; highly polymerized ethylene or partially to fully halogenated derivatives thereof, such as polytetrafluorethylene; cellulose derivatives such as cellulose acetate, nitro-cellulose, etc.; natural resins and rosins such as the terpene resins; semi- or fully inorganic resins such as the hydrolysis products of aryl and/or alkyl chlor silanes, the phosphorous chloro-nitrides, etc. The insulation 22 is firmly attached to interlayer 21 by a form of resonant hybrid bonding, such as hydrogen bonding, etc. The actual amount of such bonding occurring between adjacent molecules of 20 and 21 may vary widely. The bonds which require less energy in their formation generally form in the higher percentages, while those requiring greater heats of formation occur in smaller total percentage. Both are satisfactory, but it is often desirable to employ the latter, inasmuch as the strength of the formed bond is greater.

Figure 2:
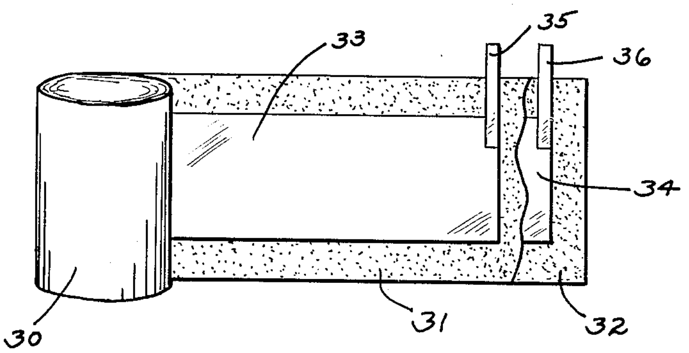
Figure 2 shows a partially unwound electrical condenser, produced in accordance with the invention.

Figure 2 illustrates a partially unwound electrical condenser. The wound unit 30 comprises dielectric spacers 31 and 32 which may be of kraft or linen paper, glass cloth, or other porous material; or of regenerated cellulose, polystyrene, highly polymerized ethylene, polytetrafluorethylene or other substantially non-porous material. These spacers are impregnated or coated with suitable dielectric resins. Insulated by the aforesaid dielectric spacers 31 and 32 are electrodes 33 and 34, which are provided with terminal tabs 35 and 36 respectively, the latter serving to connect the opposite polarity electrodes into the circuit in which the condenser is employed. The electrode foils 33 and 34 may be of copper, aluminum, lead, or other metallic material. The tabs 35 and 36 may be made of the same material. Substantially the entire surface of the electrodes is provided with a chemical interlayer (not shown) in accordance with the invention. This interlayer serves to bond the electrodes to the dielectric resin of the spacer, which is frequently a polymerizable vinyl compound or mixture thereof, thereby preventing cracking, electrical corona, arcing, etc.

The dielectric resin may be introduced in the usual manner following the winding of the unit. This treatment is generally introduced into the unit as a monomer or partial polymer in the liquid state, under a vacuum. Imprenation may often be enhanced by applying pressure, following introduction of the polymerizable liquid under vacuum. Nitrogen pressure is particularly desirable for this purpose.

Following impregnation, the dielectric impregnant may be polymerized to a solid state by heating at elevated temperatures for an extended period of time; for example, styrene may be polymerized in situ in about 24 hours at 120° C.

It is also possible to wind the condenser unit with a dielectric spacer already impregnated or coated with an excess of a monomer or polymer of a vinyl compound or other dielectric resin. Following winding, the condenser unit may be heated and, in some cases, pressed to complete polymerization and remove excess resinous material. The heating serves to bond the impregnant to the interlayer, also.

Among the dielectric resins particularly suited for such applications are n-vinyl carbazole; styrene and mono- and di-chloro-styrenes etc.

Condensers produced in accordance with this invention are particularly suitable for ultra-high- and hyper-frequencies, involving square waves as well as sine waves. The corona voltage is unusually high and life of the condensers under these extreme conditions is unusually long.

Figure 3:
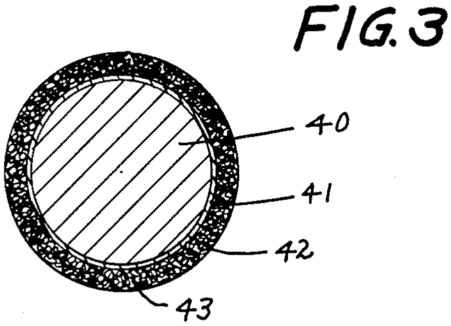
Figure 3 shows a cross-section of an insulated electrical conductor employing one of the bonds described herein.

Figure 3 illustrates in enlarged cross-section an insulated electrical conductor. Conductor 40 may be of any metal, such as copper or other low resistance material, and nichrome or other high resistance material and may be in the wire, bar, plate, tube or other form. Provided on the surface of 40 is a thin integrally bonded interlayer 41. The outer insulation is bonded to the interlayer 41 by resinous material 43 which surrounds and bonds the refractory ceramic particles 42. The manufacture and properties of the insulating coating 42 are described in greater detail in copending applications S. N. 496,978, filed by P. Robinson et al. on August 2, 1943, and entitled "Improved Electrical Conductors," now Patent No. 2,421,652, granted June 3, 1947, and S. N. 536,448, filed by S. O. Dorst on May 20, 1944, and entitled "Improved Electrical Conductors," now Patent No. 2,495,630, granted January 24, 1950. Briefly, the ceramic particles 42 may be electrophoretically deposited on the interlayer 41 and the porous deposit thus formed subsequently impregnated with resinous material 43, which may be introduced as a monomer or partial polymer. The hydrolysis products of alkyl, aralkyl and aryl chlor silanes are particularly desirable as resinous material 43. Also suitable are the polyvinyl methylal resins and polytetrafluoroethylene, both of which are vinyl polymers. The refractory ceramic particles may be of finely ground aluminum oxide, talc, china clay, zinc oxide, etc.

The bonding between the interlayer and resinous binder 43 serves to prevent the insulation from chipping and peeling off from the conductor, as well as to increase the overall resistance to abrasion.

While the above example has been directed to insulation containing a large amount of inorganic constituent, it is obvious that totally organic insulation may also be used, as for example, pyroxylin lacquers and enamels, natural and synthetic rubbers, polyamides and super-polyamides, polytetrafluoroethylene etc. may be bonded to conductors in accordance with the invention. Likewise, the bonding interlayers of the invention are useful in the manufacture of coaxial cables, in which resinous insulation may be bonded to both the inner and outer conductor. By proper bonding, the likelihood of insulation rupture and failure during binding and continued flexure of the cable, is greatly reduced.

Among the resinous insulating materials for use in coaxial cables may be mentioned polystyrene, polyethylene, polytetrafluoroethylene etc.

Figure 4:
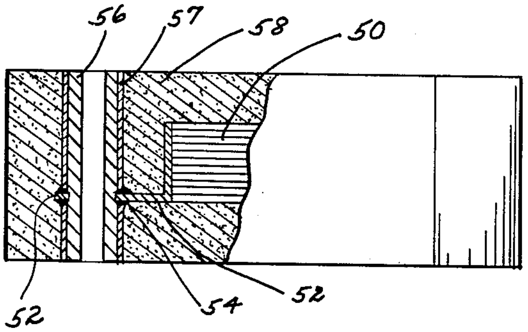
Figure 4 shows in partial cross-section a molded electrical condenser in which certain of the metal elements are bonded to the molding material.

Figure 4 illustrates in partial cross-section a molded capacitor unit. In this figure, 50 represents a stacked mica condenser section comprising alternate layers of mica and lead or other metallic foil. Alternate foils extend from opposite sides of the unit 50 and are soldered to mounting plates one of which is shown at 52, by means of solder. The mounting plates may be of tinned brass or other tinned metal, to facilitate soldering. The mounting plate 52 is attached to insert 56 by means of a slot arrangement with solder 54. The insert 56 may be of any metallic material, e. g. brass, bronze, copper, etc., and the surface may be tinned if so desired.

On the outer surface of insert 56 is provided an interlayer 57, which may be produced in accordance with the invention. 58 represents the encasing insulating material which is molded about the condenser section and insert to produce a compact, durable and permanent unit.

The molding may be accomplished in the usual manner, using a molding press and preformed discs of molding powder. The molding powder may be a finely ground condensation or polymerization resin, in which may be incorporated the usual fillers, such as ground mica, wood flour, etc. Among the condensation resins which may be used are the phenol-formaldehyde resins, urea-formaldehyde resins, melamine-formaldehyde resins, etc. Polymerization resins which may be mentioned are polystyrene, polyvinyl carbazole, styrene-divinyl benzene copolymers, the acrylic acid and ester polymers, polyvinyl alcohol, vinyl halide polymers, etc. Also suitable are natural and synthetic rubbers, which ordinarily do not readily adhere strongly to metal surfaces.

By use of the interlayer 57, made in accordance with the preceding instructions, a permanent, integral bond may be produced between insulation 58 and insert 56, thereby preventing the transmission of moisture from the atmosphere along the outer surface of insert 56, which moisture would ultimately penetrate to the condenser units.

Molded mica condensers have been produced in accordance with the invention using a copper ferrocyanide interlayer on a brass insert and a "Bakelite" molding. These condensers have been subjected to rigorous moisture, salt water and hot and cold water tests without failure, a heretofore unattainable feature in this type of unit.

It is obvious that this type of bonding is equally applicable to molded paper condensers, molded resistors, etc. as well as assemblies outside the electrical field.

As many apparently widely different embodiments of this invention may be made without departing from the spirit and scope hereof, it is to be understood that the invention is not limited to the specific embodiments hereof except as defined in the appended claims.

What we claim is:

1. An insulated electrical conductor comprising a metallic conductor of the group consisting of aluminum, copper, tin, lead and zinc on the surface of which is an in situ formed layer of a ferrocyanide of the metal at said surface, and upon which is a polyvinyl resin bonded to said ferrocyanide layer.

2. An insulated electrical conductor comprising a copper member coated with an insulating resin layer, said resin being bonded to said conductor by an interlayer of an in situ formed copper ferrocyanide.

PRESTON ROBINSON.
COLIN C. REID.

REFERENCES CITED

The following references are of record in the file of this patent:

UNITED STATES PATENTS

| Number | Name | Date |
|---|---|---|
| 179,387 | Whiting | June 27, 1876 |
| 971,641 | Rice et al. | Oct. 4, 1910 |
| 1,827,536 | Milligan | Oct. 13, 1931 |
| 2,125,387 | Mason | Aug. 2, 1938 |
| 2,163,768 | Tanner | June 27, 1939 |
| 2,399,019 | Grienter et al. | Apr. 23, 1946 |
| 2,415,361 | Mell | Feb. 4, 1947 |
| 2,417,885 | Powell et al. | Mar. 25, 1947 |
| 2,421,652 | Robinson | June 3, 1947 |
| 2,495,630 | Dorst | Jan. 24, 1950 |

FOREIGN PATENTS

| Number | Country | Date |
|---|---|---|
| 439,530 | Great Britain | Dec. 9, 1935 |
| 467,024 | Great Britain | May 14, 1936 |